US009078195B2

(12) United States Patent
Livet et al.

(10) Patent No.: US 9,078,195 B2
(45) Date of Patent: *Jul. 7, 2015

(54) MEDIA INDEPENDENT MULTI-RAT FUNCTION IN A CONVERGED DEVICE

(71) Applicant: INTERDIGITAL TECHNOLOGY CORPORATION, Wilmington, DE (US)

(72) Inventors: Catherine M. Livet, Montreal (CA); Guang Lu, Dollard-des-Ormeaux (CA); John L. Tomici, Southold, NY (US); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/854,804

(22) Filed: Apr. 1, 2013

(65) Prior Publication Data

US 2013/0215782 A1   Aug. 22, 2013

Related U.S. Application Data

(63) Continuation of application No. 11/782,851, filed on Jul. 25, 2007, now Pat. No. 8,411,651.

(60) Provisional application No. 60/820,519, filed on Jul. 27, 2006, provisional application No. 60/908,099, filed on Mar. 26, 2007.

(51) Int. Cl.
*H04W 40/10* (2009.01)
*H04L 12/701* (2013.01)
(Continued)

(52) U.S. Cl.
CPC ............. *H04W 40/10* (2013.01); *H04L 45/00* (2013.01); *H04W 40/02* (2013.01); *H04W 84/18* (2013.01); *H04W 88/06* (2013.01)

(58) Field of Classification Search
CPC ..... H04W 40/10; H04W 40/02; H04W 84/18; H04W 80/06; H04L 45/00
See application file for complete search history.

(56) References Cited

U.S. PATENT DOCUMENTS 6,978,138 B2 *  12/2005  Japenga et al. ............... 455/436
7,738,374 B2    6/2010   Yagyu et al.
(Continued)

FOREIGN PATENT DOCUMENTS

JP     2004-096247    3/2004
WO     2005/059689    6/2005
(Continued)

OTHER PUBLICATIONS

Ambient Networks, "D2-C.1 Multi-Access & ARI Design and Initial Specification", Sixth Framework Program, Priority IST-2004-.4.5, Mobile and Wireless Systems Beyond 3G Project 027662 "Ambient Networks Phase 2", (Dec. 2006), pp. 1-25.
(Continued)

*Primary Examiner* — Robert Wilson
(74) *Attorney, Agent, or Firm* — Volpe and Koenig, P.C.

(57) ABSTRACT

A communication device facilitates a multiple radio access technology (multi-RAT) mesh network and includes a processor that executes a media independent mesh function (MIMF), the MIMF configured to exchange media independent mesh information between peer mesh entities. At least two physical network links of the communication device support different radio access technologies (RATs). The MIMF is further configured to determine a RAT-agnostic link quality estimate for a signal routing, to selectively activate or deactivate each RAT-based physical network link to conserve power and control bandwidth; and to determine a multi-RAT mesh capability of a peer device.

19 Claims, 5 Drawing Sheets

(51) Int. Cl.
*H04W 40/02* (2009.01)
*H04W 84/18* (2009.01)
*H04W 88/06* (2009.01)

(56) References Cited

U.S. PATENT DOCUMENTS

| | | | |
|---|---|---|---|
| 7,990,863 B2 | 8/2011 | Yagyu et al. | |
| 8,411,651 B2* | 4/2013 | Livet et al. | 370/338 |
| 2002/0114315 A1 | 8/2002 | Kangas | |
| 2003/0054767 A1 | 3/2003 | Mandhyan et al. | |
| 2003/0235175 A1* | 12/2003 | Naghian et al. | 370/338 |
| 2005/0078672 A1 | 4/2005 | Caliskan et al. | |
| 2006/0020800 A1 | 1/2006 | Holden et al. | |
| 2006/0034233 A1 | 2/2006 | Strutt et al. | |
| 2006/0221998 A1 | 10/2006 | Livet et al. | |
| 2007/0115827 A1* | 5/2007 | Boehnke et al. | 370/236 |
| 2007/0173283 A1 | 7/2007 | Livet et al. | |
| 2008/0025329 A1* | 1/2008 | Livet et al. | 370/406 |
| 2013/0215782 A1* | 8/2013 | Livet et al. | 370/252 |
| 2014/0126410 A1* | 5/2014 | Agarwal et al. | 370/252 |
| 2014/0233412 A1* | 8/2014 | Mishra et al. | 370/252 |
| 2014/0355420 A1* | 12/2014 | Tran et al. | 370/225 |
| 2015/0045063 A1* | 2/2015 | Mishra et al. | 455/456.2 |

FOREIGN PATENT DOCUMENTS

| | | |
|---|---|---|
| WO | 2005/083950 | 9/2005 |
| WO | 2006/020800 | 2/2006 |

OTHER PUBLICATIONS

IEEE, "802.15.1 IEEE Standard for Information Technology—Telecommunications and Information Exchange Between Systems—Local and Metropolitan Area Networks—Specific Requirements Part 15.1: Wireless Medium Access Control (MAC) and Physical Layer (PHY) Specifications for Wireless Personal Area Networks(WPANs)", Revision of IEEE Std 802.15.1-2002, (Jun. 14, 2005), pp. 1-100.

IEEE, "802.16 IEEE Standard for Local and Metropolitan Area Networks Part 16: Air Interface for Fixed Broadband Wireless Access Systems", IEEE Std 802.16/2004, (Oct. 1, 2004), pp. 1-100.

IEEE, "802.16a IEEE Standard for Local and Metropolitan Area Networks Part 16: Air Interface for Fixed Broadband Wireless Access Systems—Amendment 2: Medium Access Control Modifications and Additional Physical Layer Specifications for 2-11 GHz", (Apr. 1, 2003), pp. 1-100.

IEEE, "ANSI/IEEE Std 802.11, 1999 Edition (R2003), Information Technology—Telecommunications and Information Exchange Between Systems—Local and Metropolitan Area Networks—Specific Requirements—Part 11: Wireless LAN Medium Access Control (MAC) and Physical Layer (PHY) Specifications", (Jun. 12, 2003), pp. 1-25.

IEEE, "IEEE P802.11s/D0.01 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking", (Mar. 2006), pp. 1-30.

IEEE, "IEEE P802.11s/D0.02 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking", (Jun. 2006).

IEEE, "IEEE P802.11s/D1.06 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications Amendment<number>: Mesh Networking", (Jul. 2007), pp. 1-99.

IEEE, "IEEE P802.21/D01.00 Draft IEEE Standard for Local and Metropolitan Area Networks: Media Independent Handover Services", (Mar. 2006), pp. 1-25.

IEEE, "IEEE P802.21/D05.02 Draft Standard for Local and Metropolitan Area Networks: Media Independent Handover Services", (Jun. 2007), pp. 1-30.

IEEE, "IEEE Wireless LAN Edition", A Compilation Based on IEEE Std 802.11-1999 (R2003) and Its Amendments, (2003), pp. 1-40.

Koulamas et al., "WAF: An Adaptive Protocol Framework for Multihop Wireless Network", 2004 International Workshop on Wireless Ad-Hoc Networks, pp. 254-278, (May 31, 2004).

Li et al., "A Multi-Interface Proposal for IEEE 802.21 Media Independent Handover," International Conference on the Management of Mobile Business, pp. 1-6 (Jul. 9, 2007).

Shao et al., "IEEE P802.15 Wireless Personal Area Networks", IEEE P802.15.5 Draft Candidate, IEEE P15.5/D0.01, (Jul. 2006).

* cited by examiner

MEDIA INDEPENDENT MULTI-RAT FUNCTION IN A CONVERGED DEVICE

CROSS REFERENCE TO RELATED APPLICATION

This application is a continuation of U.S. patent application Ser. No. 11/782,851, filed Jul. 25, 2007, which will issue as U.S. Pat. No. 8,411,651 on Apr. 2, 2013, and also claims the benefit of U.S. Provisional Application Ser. No. 60/820,519, filed on Jul. 27, 2006, and U.S. Provisional Application Ser. No. 60/908,099, filed on Mar. 26, 2007, all of which are incorporated by reference as if fully set forth.

FIELD OF INVENTION

The present invention is related to communication networks. More particularly, the present invention is related to the use of multiple radio technologies in a mesh network.

BACKGROUND

A trend in the telecommunications industry is the development of wireless devices that support multiple functions, such as, voice communication, music downloads, video and movie downloads, photography, location mapping, game playing, and the like. Wireless devices that support multiple functions with multiple radio access technologies (RATs) are referred to herein as multi-RAT converged devices (CDs).

Another trend in the telecommunications industry is the development of devices that support multiple access technologies and networks that support multiple devices. More specifically, work is in progress so that technologies such as wireless local area network (WLAN), Bluetooth, Worldwide Interoperability for Microwave Access (WiMAX) or IEEE 802.16, IEEE 802.3, Global System for Mobile Communications (GSM)/General Packet Radio Service (GPRS) and Evolution Data Only (EV-DO) will work together in a single network. Multiple devices can be grouped into networks with spontaneous network connectivity. These networks are referred to as mesh networks. IEEE group 802.11 (WLAN) has extended the 802.11 specification (802.11s) to include a WLAN mesh network. Similarly, IEEE group 802.15 has extended their specification to 802.15.5 for a mesh wireless personal area network (WPAN) and IEEE 802.16 has been extended to 802.16a to support a WiMAX mesh. Theses mesh architectures strive to provide robust network access with extended range, low cost and quick, easy deployment. However, each of these extensions supports only a single radio technology.

It would be desirable to have a multi-RAT mesh network wherein CDs can be used to dynamically route data from nodes, whether fixed or mobile, using the most appropriate RAT towards a destination that otherwise may not have been reached. The CD could be used as a relay for multi-RAT, multi-hop communication.

A challenge for a CD is to be able to provide consistent mesh services while utilizing multiple RATs. Mesh related functions are preferably generic and Layer 1 (L1) signaling agnostic, while selection of the radio to use for the next hop communication should be optimal, based on quality-of-service (QoS), battery level, next hop capability and the like. It would therefore be desirable to incorporate an intermediate functional layer between the radio layer and the mesh network layer that can abstract the RAT messages, the mesh-related upper layers and share mesh related information with its peers in the mesh network.

SUMMARY

The present invention is related to a communication device configured to facilitate a mesh network. The device includes a media independent mesh function (MIMF) configured to exchange media independent mesh information between peer mesh entities. The device preferably has multiple physical network links that communicate with the MIMF. The device preferably includes a media dependant mesh function and a plurality of upper layer functions. The MIMF is configured to communicate with, monitor and configure multiple radio access technologies in a single mesh network.

BRIEF DESCRIPTION OF THE DRAWINGS

A more detailed understanding of the invention may be had from the following description of a preferred embodiment, given by way of example and to be understood in conjunction with the accompanying drawing(s) wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
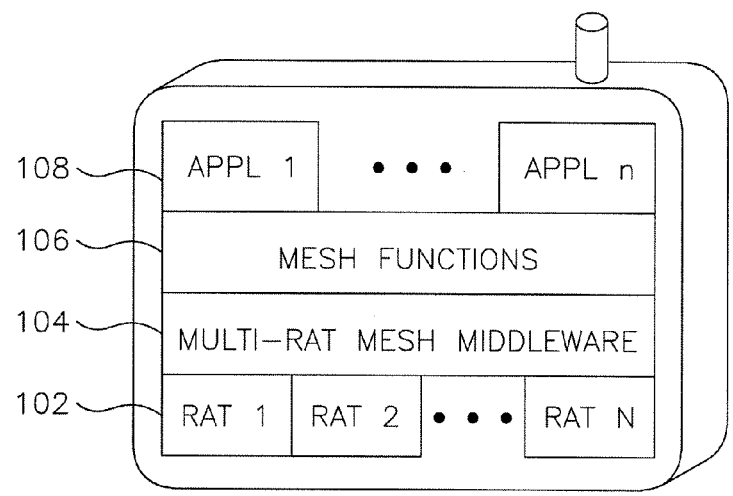
FIG. 1 is a block diagram of device equipped with multi-radio access technology in accordance with one embodiment of the present invention.

Referring now to FIG. 1, there is shown a block diagram of a device equipped with multi-radio access technology in accordance with one embodiment of the present invention. The device 100 preferably includes a physical layer 102 that may include multiple radio technologies, such as, 802.3, 802.11 and the like. The physical layer communicates with the media independent multi-RAT function 104. The MIMF 104 preferably provides multiple functions and abstracts mesh functions from the RAT technology. Mesh function 106 resides between the MIMF 104 and multiple applications 108. The mesh function 106 includes, for example, mesh routing, mesh forwarding, and the like. An application layer 108 includes a number of applications that the device uses to perform its upper level functions.

The MIMF 104 preferably provides a number of functions. The MIMF 104 may provide support for multi-RAT physical links, such as IEEE 802.3, IEEE 802.11, WLAN, Bluetooth, and WiMAX, for example. The MIMF 104 preferably provides an interface between the different radio formats and the mesh network.

The MIMF 104 preferably determines the multi-RAT mesh capability of a peer node. This may include, for example, a peer's active RATs, network identities, and levels of connectivity, such as wide-area and local-area. This may also include determining a peer node's routing capabilities, administrative and security requirements and power-saving techniques.

The MIMF 104 may monitor individual RATs in order to detect and report changes in the status of neighboring mesh nodes. The MIMF 104 may also compare individual RAT links and provide a coherent link cost estimate for each RAT. The comparison may be transmitted to mesh upper layer functions and used as input for various decision making processes. By way of example, the MIMF 104 may abstract the metrics that are specific to each RAT in a network to determine a RAT-agnostic link quality estimate that may be used, for example, for signal routing.

The MIMF 104 may handle data scheduling duties for data that is exchanged between the different RATs. Furthermore, the MIMF 104 may control power to each RAT, turning each RAT on or off as needed to conserve power and increase bandwidth.

Figure 2:
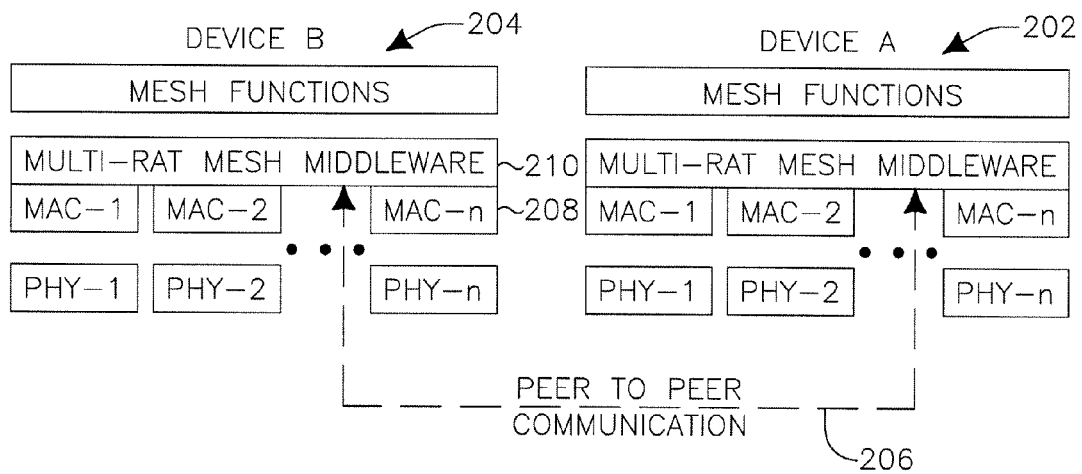
FIG. 2 is a block diagram showing a typical multi-RAT mesh communication network in accordance with one embodiment of the present invention.

FIG. 2 shows a block diagram of a multi-RAT peer protocol in accordance with one embodiment of the present invention. Multi-RAT device A 202 may communicate with Multi-RAT device B 204 across the peer-to-peer communication link 206. The link 206 may be compliant with IEEE 802.21 and may use, for example, media independent handover (MIH) Information Service or some other Internet Protocol (IP)-type protocol. The medium access control (MAC) layer 208 preferably is compliant with legacy systems such as 802.11, 802.15 or 802.16. Preferably, the MAC layer 208 is a mesh capable MAC, such as 802.11s, 802.15.5 or 802.16a. The MIMF 210 may communicate with both mesh and non-mesh MACs.

Figure 3:
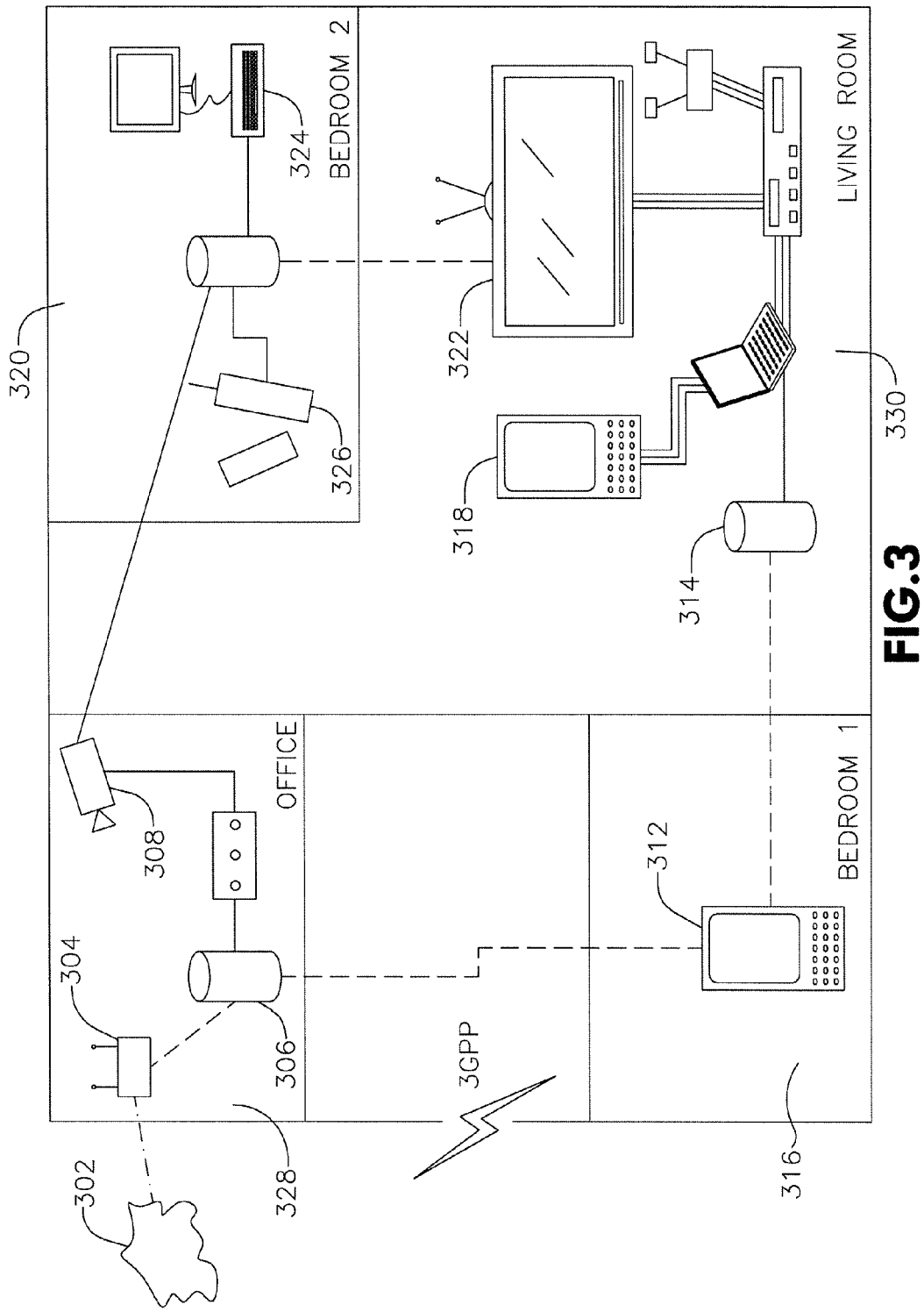
FIG. 3 is a block diagram of a typical Multi-RAT home network in accordance with one embodiment of the present invention.

A typical home network may be configured as a multi-RAT mesh network. FIG. 3 is a block diagram of a typical multi-RAT mesh home network in accordance with one embodiment of the present invention. In a first bedroom 316 is a Third Generation Partnership Project (3GPP) compliant handset 312. In a second bedroom 320 is a land-line telephone 326 and a personal computer (PC) 324. In the home office 328 is a video camera 308, a desktop PC 306 and a wireless Multiple Input/Multiple Output (MIMO) router 304. The land-line phone 326, the bedroom PC 324, the video camera 308 and the office PC 306 are networked over a Bluetooth network. The home also has a WiFi network that includes the bedroom PC 324 the entertainment system 322 in the living room 330, the laptop PC 314 in the living room 330, the PC 312 in bedroom 1 314, the office PC 306 and the wireless MIMO router 304. The entertainment system 322 communicates internally over a Wireless-Universal Serial Bus (W-USB bus). The wireless handset 318 also communicates with the laptop PC 314 over W-USB bus. Lastly, the wireless MIMO router 304 is in communication with the Internet 302 over a WiMax connection. As shown in FIG. 3, there are four (4) different RATs functioning in 10 different devices. Using multi-RAT mesh technology, all these devices can be networked without additional cabling. The network can be extended easily, and can survive the loss of a node. Lastly, the network can provide high data throughput.

Figure 4:
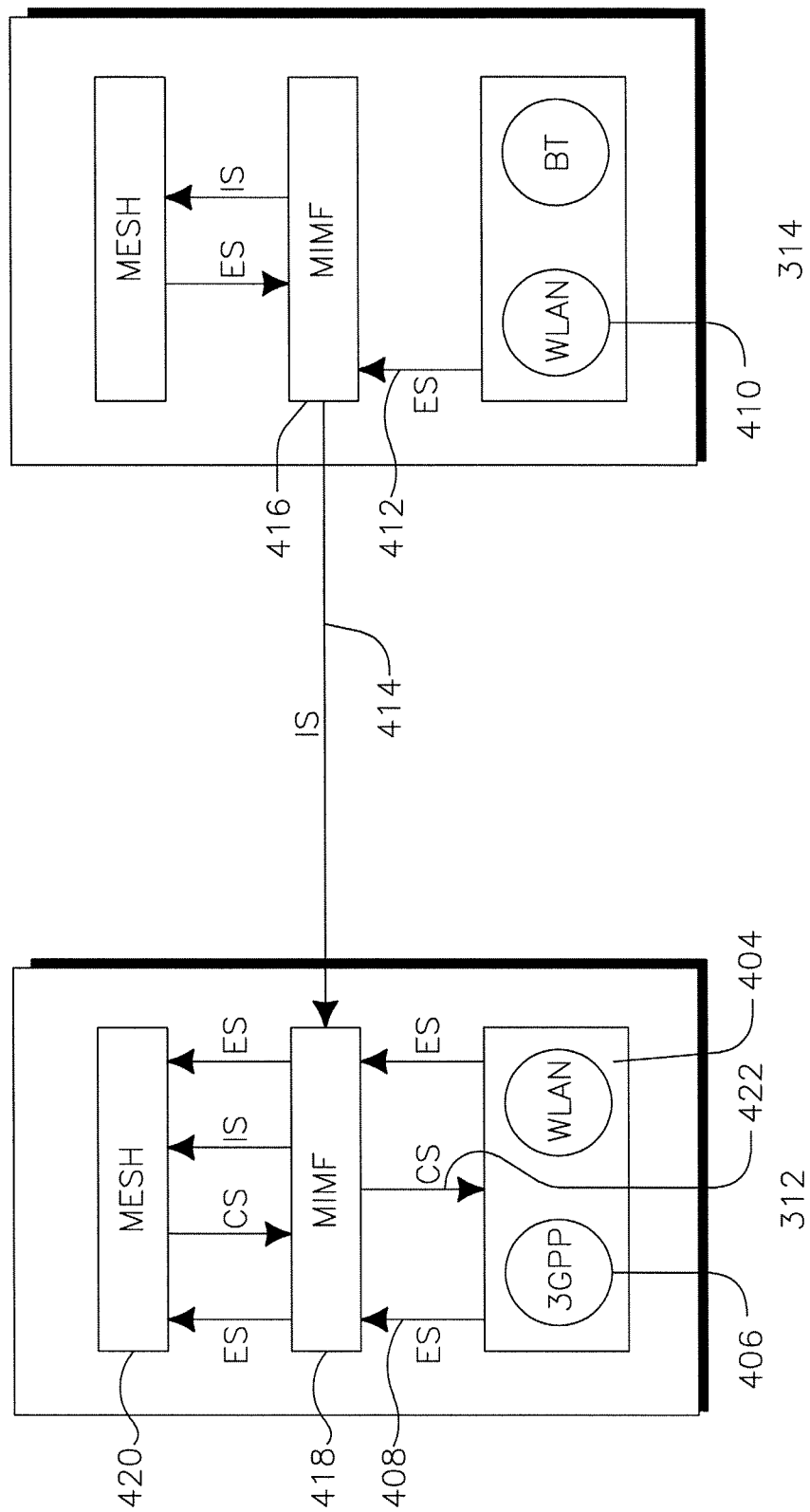
FIG. 4 is a block diagram of signal flow for adding a device to a typical Multi-RAT network in accordance with one embodiment of the present invention.

FIG. 4 is a block diagram of signal flow for adding a device to a typical multi-RAT network in accordance with one embodiment of the present invention. For example, when the handset (312 of FIG. 3) is powered on, it detects both a 3GPP network and a WLAN network. In the handset 312, a WLAN entity 404 and a 3GPP entity 406 generate an event service 408. The PC in the bedroom (314 of FIG. 3) detects WLAN activity and its WLAN entity 410 generates an event service 412. The PC 314 provides WLAN mesh details to the 3GPP handset 312 over information service (IS) 414. The media independent mesh function 416 in the PC 314 sends a media independent mesh function IS 414 to the MIMF 418 of the handset 312 . The information in the information service signal may include mesh network availability, mesh routing, quality of service requirements, and the like. The MIMF 418 of the handset 312 transmits the information to the mesh function 420. The handset 312 decides to join the network and the MIMF 418 configures the WLAN links accordingly. The command service link 422 can be configured in order to, for example, power down the 3GPP function for power savings.

Figure 5:
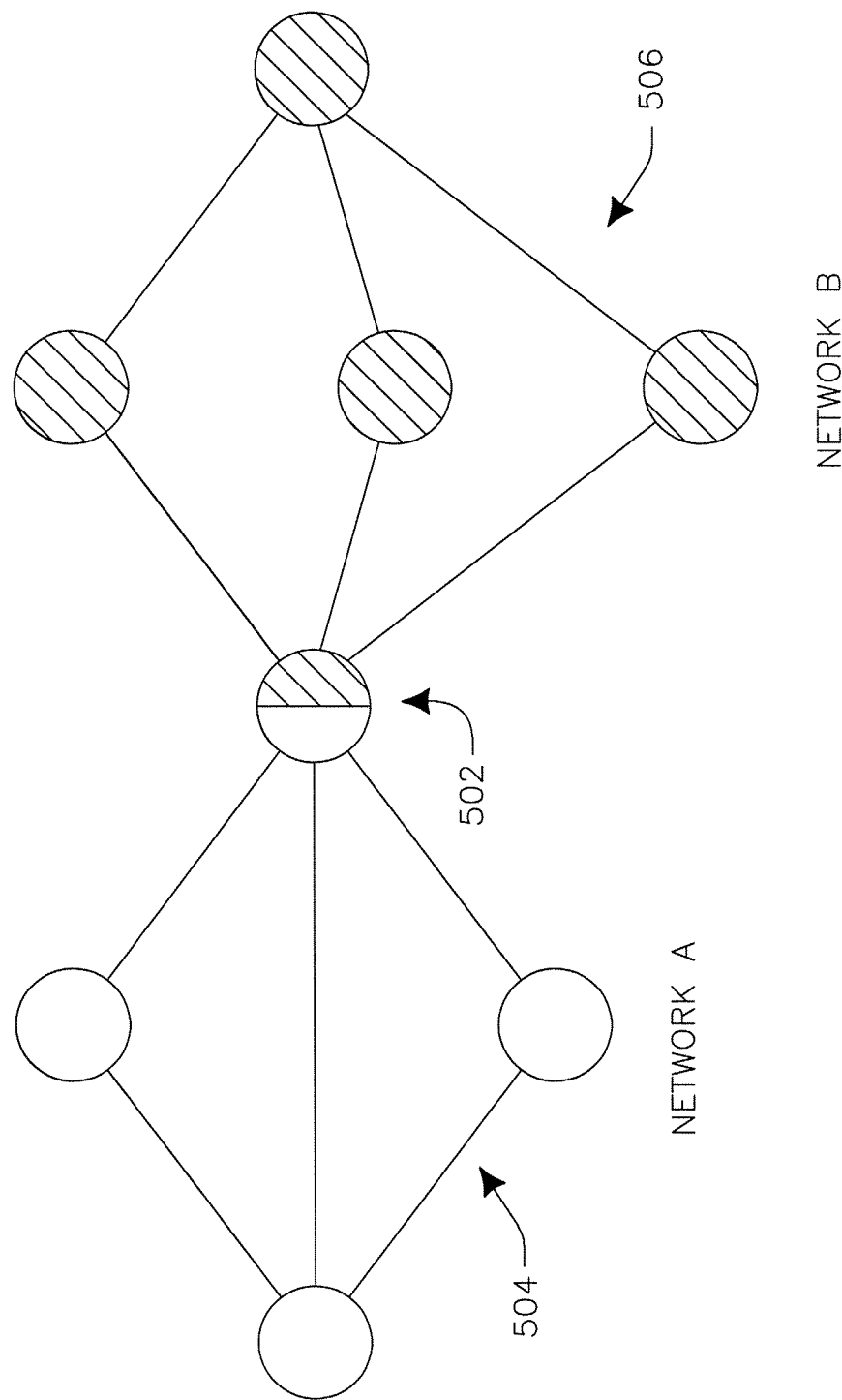
FIG. 5 is a diagram of a mesh network with a Multi-RAT convergence device proxy is accordance with one embodiment of the present invention.

FIG. 5 is a diagram of a mesh network with a Multi-RAT Convergence Device proxy in accordance with one embodiment of the present invention. A multi-RAT device 502 serves as a portal for mesh network A 504 and mesh network B 506. Mesh network A 504 is compatible with a single radio. Mesh network B 506 is compatible with a single radio that is different from the radio used in mesh network A 504. A multi-RAT device 502 can act as a bridge between the two networks.

Figure 6:
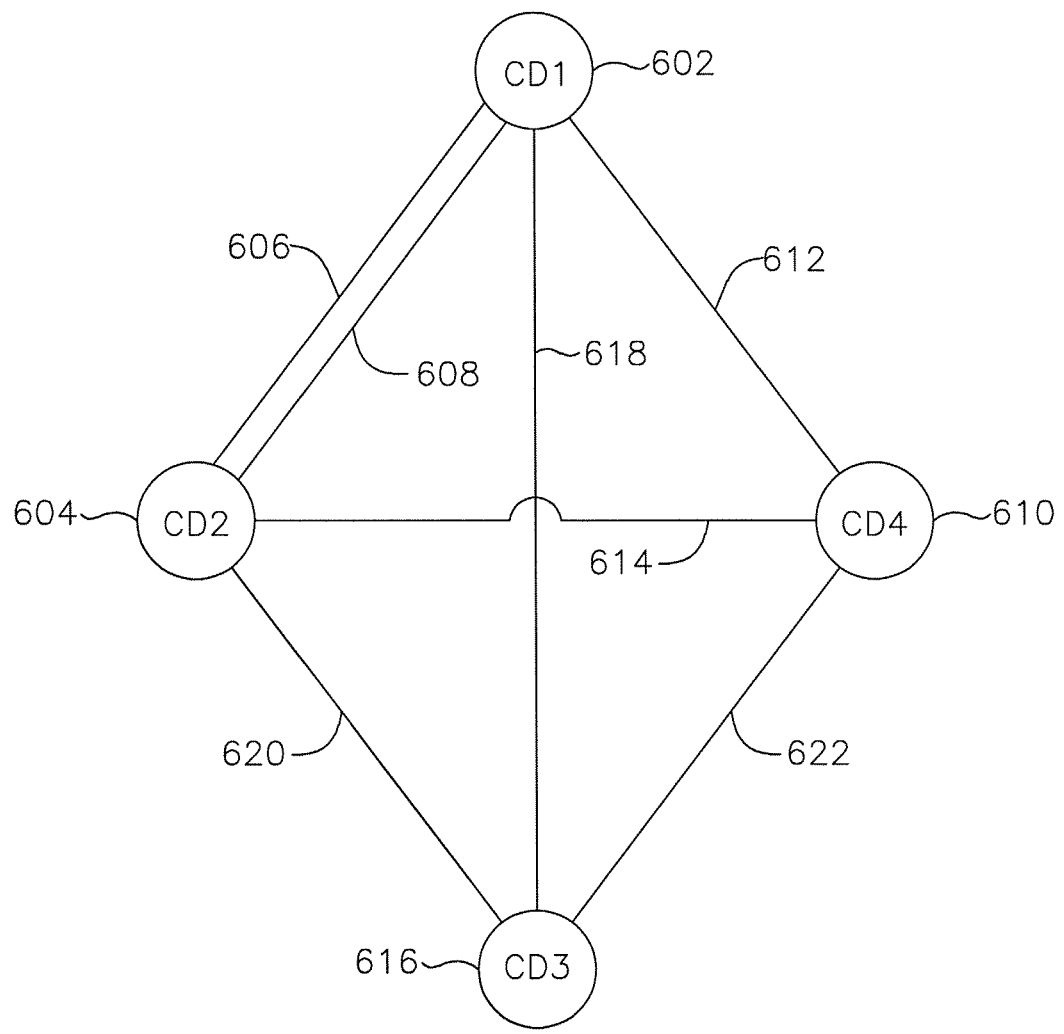
FIG. 6 is a diagram of a mesh network in accordance with an alternative embodiment of the present invention.

FIG. 6 is a diagram of a mesh network 600 in accordance with an alternative embodiment of the present invention. Each node on the network is a multi-RAT device. A MIMF in each device enables the multi-RAT connections. The MIMF has the flexibility to configure the network in multiple ways. In FIG. 6, device CD1 602 is compatible with radio 1 and radio 2. Device CD2 604 is also compatible with radio 1 and radio 2. CD1 602 and CD2 604 communicate over link 606 and link 608. Device CD4 610 is compatible with radio 2 and radio 3. CD4 610 communicates with CD1 over link 612 and CD2 604 over link 614 using radio 2. Device CD3 616 is compatible with radio 1 and radio 3. CD3 616 communicates with CD1 602 over link 618 and CD2 over link 620 using radio 1. CD3 616 communicates with CD4 610 over link 622 using radio 3. The media independent mesh function informs each of the mesh functions in each of the mesh devices about the other mesh devices in the network, including the active radios for each mesh device.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A communication device configured to facilitate a mesh network communicating on multiple radio access technologies (RATs), the communication device comprising:
   at least two physical network ports, wherein each of the at least two physical network ports support a different RAT;
   a processor for executing a media independent mesh function (MIMF), wherein the MIMF comprises:
      exchanging media independent mesh information between peer mesh entities;
      determining a RAT-agnostic link quality estimate for signal routing;
      selectively activating or deactivating each RAT-based physical network port to conserve power and control bandwidth; and
      determining a multi-RAT mesh capability of a peer device.

2. The communication device of claim 1, wherein the at least two physical network ports communicate directly with the MIMF.

3. The communication device of claim 2, further comprising a media dependent mesh function and upper layer functions, wherein the MIMF operates as middleware between the physical network ports and the media dependent mesh function.

4. The communication device of claim 1, wherein the MIMF further comprises:
   monitoring a plurality of RATs; and
   reporting changes in status detected in at least one peer device.

5. The communication device of claim 1, wherein the MIMF further comprises:
   comparing a plurality of physical network ports related to a respective plurality of RATs to determine a coherent link cost estimate for each of the plurality of RATs.

6. The communication device of claim 1, wherein the MIMF further comprises:
   scheduling a data transfer across the mesh network.

7. The communication device of claim 1, wherein the MIMF further comprises:
   selectively activating a RAT; and
   adjusting a bandwidth between the communication device and at least one peer device.

8. A method for communication between multiple radio access technologies (RATs) in a mesh network, the method comprising:
   controlling, by a processor executing a media independent mesh function (MIMF), data flow between a plurality of mesh nodes;
   extracting, by the processor executing the MIMF, metrics that are specific to each of a plurality of RATs associated with at least two physical network ports, wherein each of the at least two physical network ports support a different RAT;
   determining, by the processor executing the MIMF, a RAT-agnostic link quality estimate for signal routing;
   determining, by the processor executing the MIMF, a multi-RAT mesh capability of a peer device; and
   selectively activating or deactivating, by the processor executing the MIMF, each RAT-based physical network port to conserve power and control bandwidth.

9. The method of claim 8, wherein the metrics that are specific to each of the plurality of RATs comprise at least one of a quality of service, a battery level of a device, or a RAT capability of a device.

10. The method of claim 8, further comprising:
    transmitting, by the processor executing the MIMF, mesh data to a second processor executing a second MIMF, wherein the second processor executing the second MIMF resides in a separate mesh device.

11. The method of claim 8, further comprising:
    monitoring, by the processor executing the MIMF, each RAT in the network and reporting changes in peer node status to a plurality of processors executing a plurality of MIMFs residing in a plurality of mesh devices.

12. The method of claim 8, further comprising:
    determining, by the processor executing the MIMF, a standardized measure of signal quality; and
    tracking, by the processor executing the MIMF, the standardized measure for all mesh nodes.

13. The method of claim 8, further comprising: adjusting, by the processor executing the MIMF, bandwidth between devices by selectively activating and deactivating a RAT.

14. The method of claim 8, wherein the determined multi-RAT mesh capability of the peer device includes active RATs for the peer device.

15. The method of claim 8, wherein the determined multi-RAT mesh capability of the peer device includes network identities for the peer device.

16. The method of claim 8, wherein the determined multi-RAT mesh capability of the peer device includes a level of wide-area connectivity and a level of local-area connectivity.

17. The method of claim 8, wherein the determined multi-RAT mesh capability of the peer device includes routing capabilities of the peer device.

18. The method of claim 8, wherein the determined multi-RAT mesh capability of the peer device includes administrative and security requirements of the peer device.

19. The method of claim 8, wherein the determined multi-RAT mesh capability of the peer device includes a power-saving techniques of the peer device.

* * * * *